Jan. 20, 1925.　　　　　　　　　　　　　　　　　　　1,523,938
J. D. ENGLISH
NONSKID CHAIN
Original Filed Aug. 10, 1921
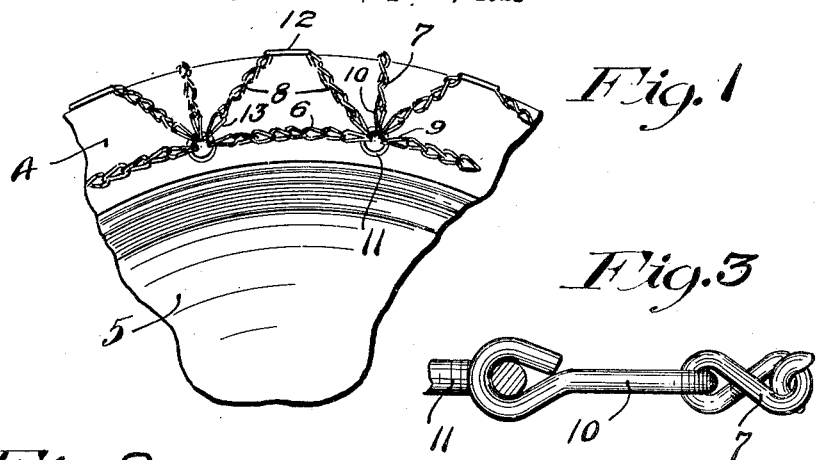
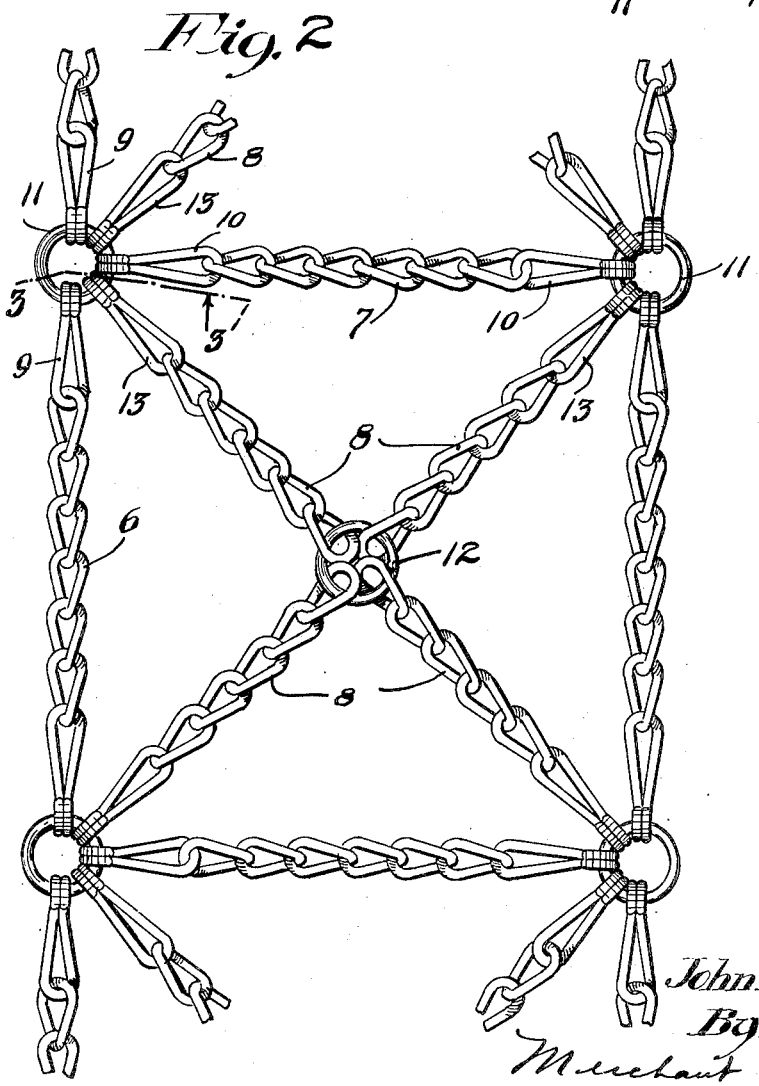
Inventor
John D. English
By his Attorneys Patented Jan. 20, 1925.

1,523,938

UNITED STATES PATENT OFFICE.

JOHN D. ENGLISH, OF WATERTOWN, SOUTH DAKOTA.

NONSKID CHAIN.

Original application filed August 10, 1921, Serial No. 491,109. Divided and this application filed September 30, 1922. Serial No. 591,650.

*To all whom it may concern:*

Be it known that I, JOHN D. ENGLISH, a citizen of the United States, residing at Watertown, in the county of Codington and State of South Dakota, have invented certain new and useful Improvements in Nonskid Chains; and I do hereby declare the following to be a full, clear, and exact description of the invention, such as will enable others skilled in the art to which it appertains to make and use the same.

My present invention relates to non-skid chains, and is filed as a division of my copending application entitled "Chain coupling", filed August 10, 1921, under Serial Number 491,109, and formally allowed April 21, 1922.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary side elevation of a pneumatic tire mounted on a disc wheel and having applied thereto the improved non-skid chain;

Fig. 2 is a fragmentary plan view of the invention; and

Fig. 3 is a detail view with some parts sectioned on the line 3—3 of Fig. 2, on an enlarged scale.

The numeral 4 indicates a pneumatic tire mounted on a disc wheel 5 and having applied thereto the improved non-skid chain which comprises two sectional side chains 6, cross tread chains 7, and oblique cross tread chains 8. Each section of each side chain 6 has, at each of its ends, a hook-like link 9, and each cross tread chain 7 has, at each of its ends, a hook-like link 10.

The sections of the side chains 6 and cross tread chains 7 are connected in rectangular arrangement by rings 11 at the corners of the rectangles, and with which rings the hook-like links 9 and 10 separably interlock. The oblique cross tread chains 8, in each rectangle are made up of sections connected by a ring 12, at their intersection, and having at each of their four outer ends hook-like links 13 which are separably interlocked with the rings 11 between the hook-like links 9 and 10. In actual construction, the hook-like links 13 will have a twist like the main links in the chains so that they will lie flat against the sides of the tire 4.

As best shown in Fig. 2, the sections of the side chains 6 and the cross tread chains 7 are of the same length so that they may be interchangeably used, thus making it necessary to carry repair chain sections of one length only, and which sections may be used in replacing broken sections of the side chains or broken cross tread chains. To remove a broken side chain section or a broken cross tread chain, it is only necessary to pry open the respective hook-like links to separate the broken sections from the rings 11 and then apply a new section by interlocking its hook-like links, which are primarily open, to the rings 11 and pressing or pounding the same closed.

Suitable couplings, preferably of the type disclosed and claimed in my above identified application, will be used for separably connecting the ends of the side chains 6.

In addition to a complete non-skid chain, one or more rectangular sections thereof may be carried for use as an emergency chain, and applied to a tire when the wheel is stuck in mud, loose sand, or snow. Such an emergency chain may be secured to the spokes of the wheel or in any other suitable way.

What I claim is:

1. A non-skid chain comprising side chains and cross tread chains forming a rectangle, rings at the corners of the rectangle, said side chains and cross tread chains having at their ends hook-forming links separably attached to the rings, and a pair of oblique cross tread chains in the rectangle, connected at their intersection and having at their ends hook-forming links separably attached to the rings between the hook-forming links of the side chains and cross tread chains.

2. A non-skid chain comprising side chains and cross tread chains forming a rectangle, said side and cross tread chains being separably connected at the corners of the rectangle, said side and cross tread chains being interchangeably usable.

In testimony whereof I affix my signature.

JOHN D. ENGLISH.